(12) United States Patent
Ghaddar et al.

(10) Patent No.: US 10,839,467 B2
(45) Date of Patent: Nov. 17, 2020

(54) TRAVEL MOBILITY AS A SERVICE (MAAS)

(71) Applicant: INTERNATIONAL BUSINESS MACHINES CORPORATION, Armonk, NY (US)

(72) Inventors: Bissan Ghaddar, Dublin (IE); Giovanni Russo, Dublin (IE); Robert Shorten, Mulhuddert (IE); Rudi Verago, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 78 days.

(21) Appl. No.: 15/413,591

(22) Filed: Jan. 24, 2017

(65) Prior Publication Data

US 2018/0211337 A1   Jul. 26, 2018

(51) Int. Cl.
| | |
|---|---|
| *G06Q 50/14* | (2012.01) |
| *G06Q 50/30* | (2012.01) |
| *G01C 21/34* | (2006.01) |
| *G06N 20/00* | (2019.01) |

(52) U.S. Cl.
CPC ......... *G06Q 50/14* (2013.01); *G01C 21/3438* (2013.01); *G01C 21/3476* (2013.01); *G01C 21/3484* (2013.01); *G01C 21/3492* (2013.01); *G06N 20/00* (2019.01); *G06Q 50/30* (2013.01)

(58) Field of Classification Search
CPC .... G06Q 50/14; G06Q 50/30; G01C 21/3423; G01C 21/3476; G01C 21/3484; G01C 21/3492; G01C 21/3697; G06N 99/005
See application file for complete search history.

(56) References Cited

U.S. PATENT DOCUMENTS

| | | | |
|---|---|---|---|
| 6,212,473 B1 * | 4/2001 | Stefan | G01C 21/3484 340/990 |
| 7,949,464 B2 | 5/2011 | Kaplan et al. | |
| 8,880,601 B2 | 11/2014 | Boskovic | |
| 2005/0010358 A1 | 1/2005 | Hayot et al. | |
| 2011/0022425 A1 | 1/2011 | Block et al. | |
| 2012/0095675 A1 * | 4/2012 | Tom | G01C 21/343 701/425 |

(Continued)

FOREIGN PATENT DOCUMENTS

EP   3133536 A1 *   2/2017   ............. G06N 5/048

OTHER PUBLICATIONS

Chen et al., "Map-Matching based on Driver Behavior Model and Massive Trajectories," IEEE 17th International Conference on Intelligent Transportation Systems (ITSC), Oct. 8-11, 2014 (6 pages).

*Primary Examiner* — Aaron L Troost
(74) *Attorney, Agent, or Firm* — Griffiths & Seaton PLLC

(57) ABSTRACT

Embodiments for improving travel mobility as a service (MaaS) by one or more processors. A selected mode of transportation may be matched with a selected route to generate a travel package according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions.

14 Claims, 7 Drawing Sheets

(56) References Cited

U.S. PATENT DOCUMENTS

| | | | |
|---|---|---|---|
| 2013/0110642 A1* | 5/2013 | Lee | G06Q 30/0271 |
| | | | 705/14.67 |
| 2015/0276419 A1 | 10/2015 | Hashem et al. | |
| 2016/0216130 A1 | 7/2016 | Abramson et al. | |
| 2016/0231129 A1* | 8/2016 | Erez | G01C 21/3423 |
| 2017/0213273 A1* | 7/2017 | Dietrich | G01C 21/3461 |

* cited by examiner

TRAVEL MOBILITY AS A SERVICE (MAAS)

BACKGROUND OF THE INVENTION

Field of the Invention

The present invention relates in general to computing systems, and more particularly to, various embodiments for improving travel mobility as a service (MaaS) by providing customized multi-modal solutions based on user preference by a processor.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, entertainment, travel and other devices. Accordingly, the use of computers, network appliances, and similar data processing devices continue to proliferate throughout society. For example, vehicles of every kind, size, and energy consumption are prevalent in every aspect of today's society, as people are more mobile today than likely at any time in recorded history.

SUMMARY OF THE INVENTION

Various embodiments for improving travel mobility as a service (MaaS) by a processor, are provided. In one embodiment, by way of example only, a method for improving travel mobility as a service (MaaS) by providing customized multi-modal solutions based on user preference by a processor is provided. A selected mode of transportation may be matched with a selected route to generate a travel package according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DECUSTOMIZED DESCRIPTION OF THE DRAWINGS

Figure 1:
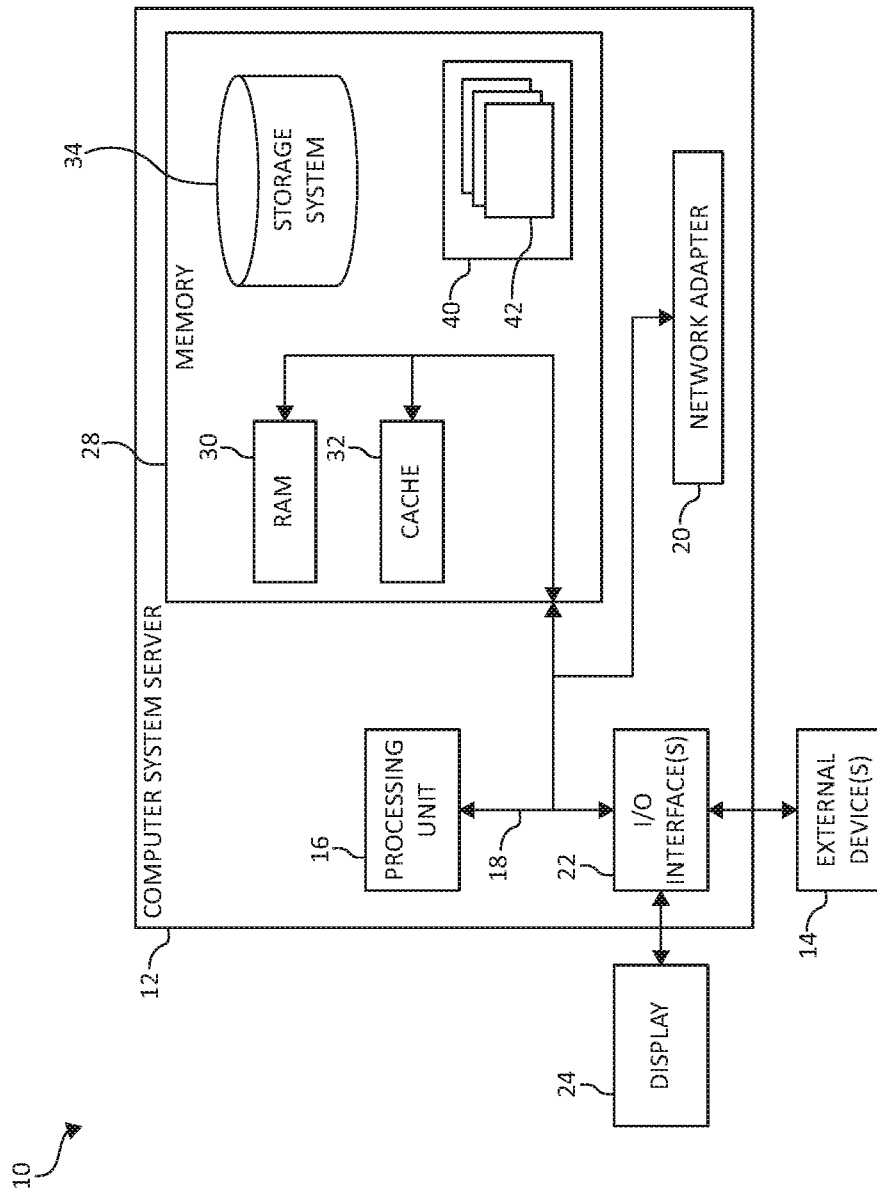
FIG. 1 is a block diagram depicting an exemplary computing node according to an embodiment of the present invention.

Rapid growth in the use and demand in various transportation sectors have resulted in an increased need to adapt to the competitive transportation environment. The complexity of transportation infrastructures often times create challenges for individuals, such as operators of vehicles, to safely plan and travel through these complex environments. The adaptation of the advancing technology to gather, collect, and improve the transportation system may be used to increase the transportation experience and increase the efficiency and utilization of both the mode of transportation and the types of transportation sector.

For example, mobility-as-a-Service (MaaS) describes a shift away from personally owned modes of transportation and towards mobility solutions that are consumed as a service. This may be enabled by combining transportation services from public and private transportation providers through a unified gateway that creates and manages travel from an origin to a destination. In one aspect, MaaS may offer both travelers and goods mobility solutions based on the travel needs. Also, MaaS is not limited to individual mobility; the approach can be applied to movement of goods, as well—particularly in urban areas. Thus, a need exists for enhancing MaaS and providing an intelligent and interactive transportation system that takes into account the user needs, utilizes all the information related to the transportation, and provides one or more travel related suggestions with and/or without user interaction.

Thus, the mechanisms of the present invention provide a solution for improving travel MaaS by a processor. In one embodiment, by way of example only, a method for improving travel MaaS is provided by using customized multi-modal solutions based on user preference. A selected mode of transportation may be matched with a selected route to generate a travel package according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions. The travel package that includes at least the matching selected mode of transportation, the selected route, and one or more travel suggestions may be provided in an interactive graphical user interface (GUI) on a computing device enabled to receive one or more inputs from a user.

In an additional aspect, a multimodal routing planner and multi-objective optimization model is provided. Environmental information, sensing technologies and enhanced maps, public transportation timetables/prices may be used in the multimodal routing planner and multi-objective optimization models to generate all the potential routes from an origin to a destination considering different modes of transportation. In one aspect, a selected route (e.g. best route) is identified and matched with a mode of transportation using multiple data as input (user preferences, user profile, "similar"/"closest" user's profiles and decisions, routes information, environmental information) into the multimodal routing planner.

As one of ordinary skill in the art will appreciate, a "best" route or transportation mode may be dependent on a number of factors, including such factors as a user profile (e.g., driver habits, preferences, time constraints, experience, biological information, health, conditioning, and the like), environmental factors or profiles, route profile, and/or transportation factors (e.g., vehicles, airplanes, trains, etc.). The user profile may also include calendar information, preferences and interests of the user, key performance indicators (KPI), a physical or emotional condition of the user, travel experience of the user, preferred transportation means, and common travel destinations. A route profile may include a maximum or minimum speed, a type of travel route, a length of a travel route, an elevation, mapping information, and one or more points of interest. The environmental profile includes at least weather, traffic conditions, construction, legal restrictions or requirements, and transportation services. A mode of transportation means may include a vehicle, a train, plane, and private and/or public transportation options. A user profile may be continuously improved and enhanced by monitoring user decisions. That is, a user's behavior, selection choices, preferences based on one or more previously selected or used routes and previous behavior may be monitored and learned using machine learning. One or more commercial offers, advertisements, parking options, estimated travel expenses, and the like may be suggested, which may be selected for presentation to the user via a trained machine learning model. A cloud computing/edge system for running the process, storing the results and using them as smart cache.

Additional aspects of the present invention and attendant benefits will be further described, following.

It is understood in advance that although this disclosure includes a decustomized description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
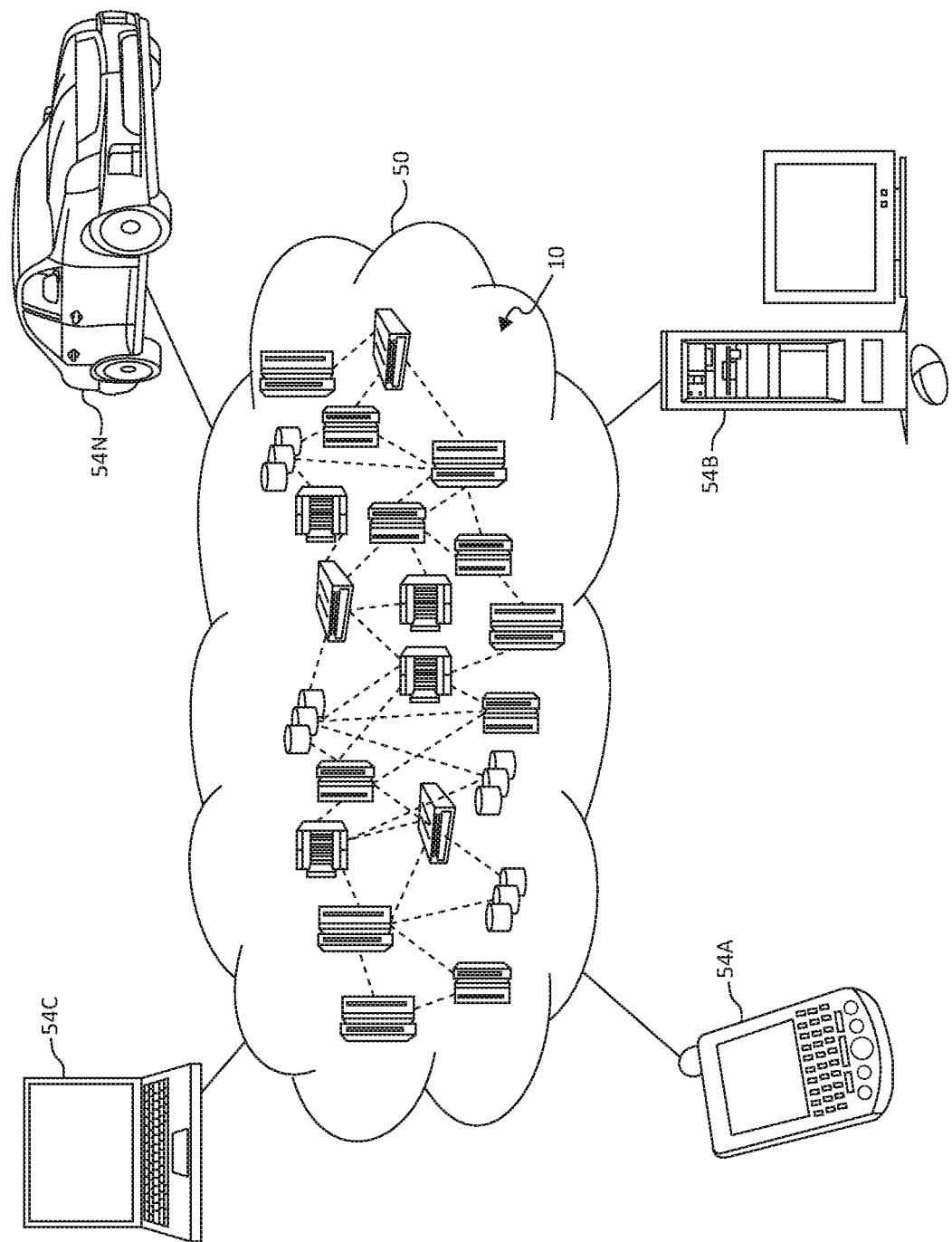
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
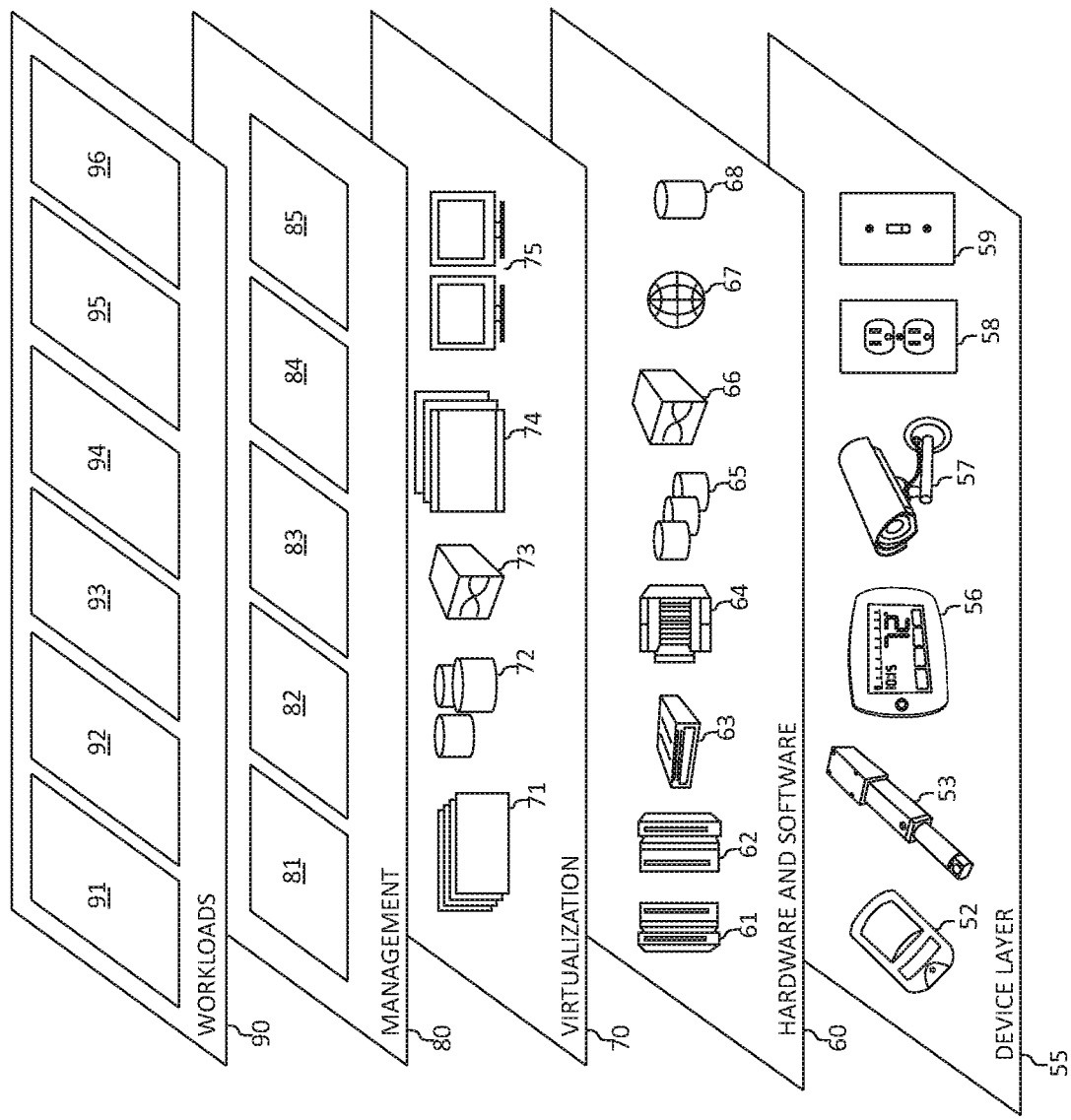
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various travel mobility as a service (MaaS) workloads and functions 96. In addition, travel MaaS workloads and functions 96 may include such operations as data analysis (including data collection and processing from various environmental sensors), collaborative data analysis, matching analysis, and predictive data analytics functions. One of ordinary skill in the art will appreciate that the travel MaaS workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
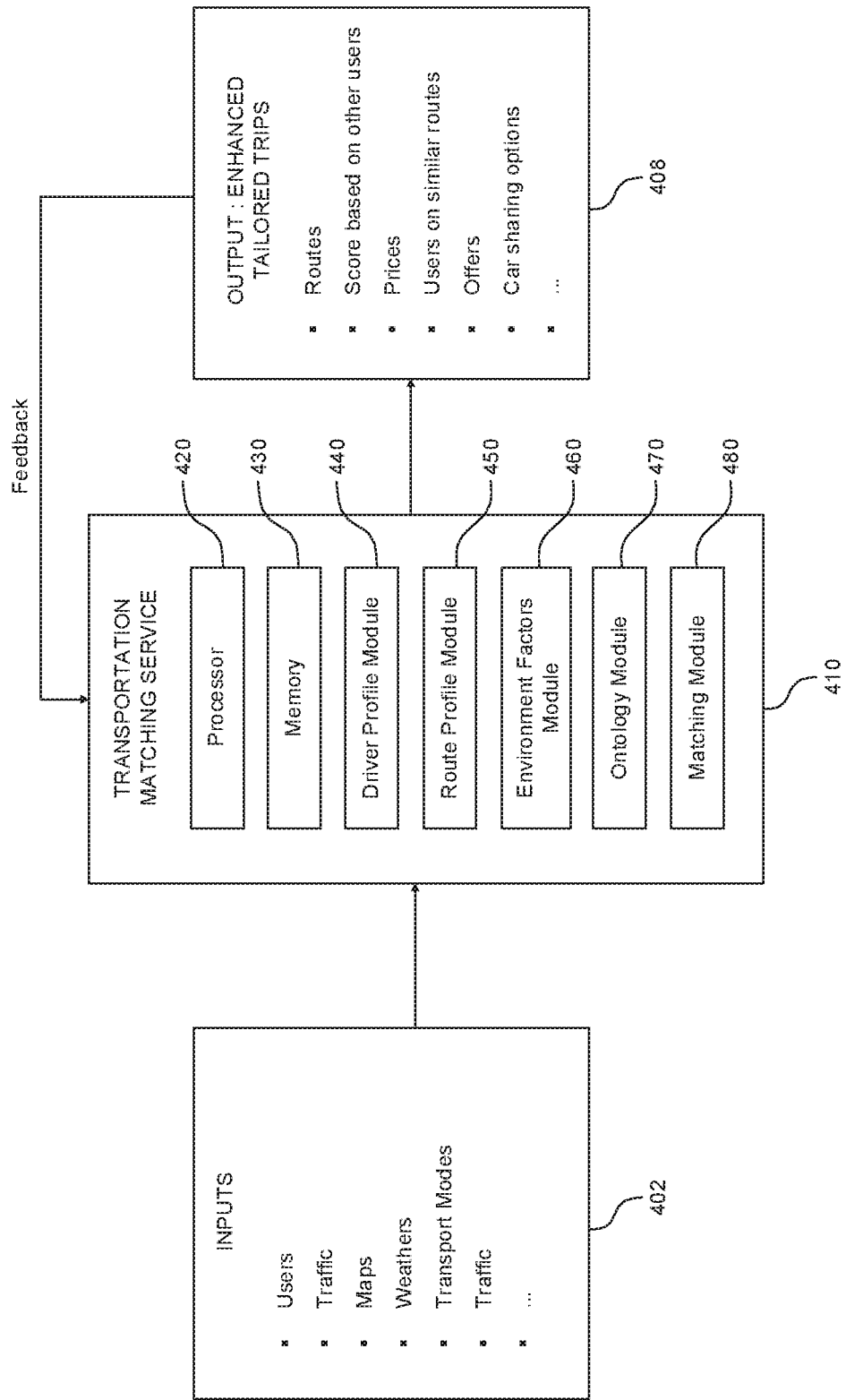
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments, is shown. In one aspect, one or more of the components, modules, services, applications, and/or functions described in FIGS. 1-3 may be used in FIG. 4.

A transportation matching service 410 is shown, incorporating at least one processing unit 420 ("processor") to perform various computational, data processing and other functionality in accordance with various aspects of the present invention. The processing unit 420 may be in communication with memory 430. A driver profile module 440, route profile module 450, an environmental factors module 460, an ontology module 470 of a knowledge domain, and a matching module 480 is shown, each of which may also be in communication with and/or controlled by the processor 420.

In one aspect, the functional components 400 illustrate a feedback loop with one or more various inputs 402 used by the transportation matching service 410 to generate an output 408 of all potential transportation routes from an origin to a destination ("O-D") while considering one or more various modes of transportation such as, for example, a vehicle, a train, and/or a plane. Thus, the functional components 400 may use a feedback look for matching a selected mode of transportation with a selected route to generate a travel package according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions.

As one of ordinary skill in the art will appreciate, the depiction of the various functional units in transportation matching service 410 is for purposes of illustration, as the functional units may be located within the transportation matching service 410 or elsewhere within and/or between distributed computing components. In one aspect, the transportation matching service 410 may use an ontology module 470. The ontology module 470 may include a knowledge domain or data and meta-data repository of routes, roads, streets, highways, interstates, bridges, airports, train stations, bus stations, airplanes, airports, subways, parking facilities, maps, a variety of infrastructures relating to travel having information relating to both size, length, a degree of complexity or difficulty (e.g., travel navigation complexity) of the infrastructure, visibility, problems or issues relating to road work or repair, traffic congestion patterns and data, travel services, travel related retail or commercial businesses, types and descriptions of various means or modes of transportations, user/driver profiles, environmental factors and conditions, and any other types of data or information relating to travel and travel related services.

In one aspect, a thesaurus or ontology as the knowledge domain, relating to the ontology module 470, may be used for the transportation matching service 410 with the information and concepts relating to routes, roads, streets, highways, interstates, bridges, maps, and/or a variety of infrastructures relating to travel each having information relating to both size, length, a degree of complexity or difficulty (e.g., travel navigation complexity), visibility, problems or issues relating to road work or repair, and/or traffic congestion. In one aspect, the ontology module 470 may be in association with one or more various applications, which may continuously provide updated information for the ontology. The thesaurus and ontology may also be used to assist with the transportation matching service 410.

In one aspect, the term "domain" is a term intended to have its ordinary meaning. In addition, the term "domain" can include an area of expertise for a system or a collection of material, information, content and/or other resources related to a particular subject or subjects. For example, a domain can refer to information and concepts relating to routes, roads, streets, highways, interstates, bridges, maps, and/or a variety of infrastructures relating to travel each having information relating to both size, length, a degree of complexity or difficulty (e.g., travel navigation complexity), visibility, problems or issues relating to road work or repair, and/or traffic congestion information. A domain can refer to information related to any particular subject matter or a combination of selected subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class, concept and/or property. Content can be any searchable information, for example, information distributed over a computer-accessible network, such as the Internet. A concept can generally be classified into any of a number of concepts which may also include one or more sub-concepts, all potentially connected with other concepts via properties defined in the ontology. Examples of concepts may include, but are not limited to, information and concepts relating to routes, roads, streets, highways, interstates, bridges, maps, and/or a variety of infrastructures relating to travel each having information relating to both size, length, a degree of complexity or difficulty (e.g., travel navigation complexity), visibility, problems or issues relating to road work or repair, and/or traffic congestion, information about individual people, cultures, groups, sociological groups, market interest groups, institutions, universities, governments, teams, travel services, or any other travel related services or industries. The ontology can be continuously updated with the information synchronized with the sources, adding information from the sources to the ontology as models, attributes of models, or associations between models within the ontology.

The driver profile module 440, the route profile module 450, and the environmental factors module 460, ontology module 470, and matching module 480 may each work in concert with processing unit 420 and memory 430 to accomplish various aspects of the present invention. In one aspect, the transportation matching service 410 may provide one or more suggestions of multi-modal optimized routes taking into account various inputs 402. As previously stated, the transportation matching service 410 may operate in a closed loop environment by receiving one or more inputs 402 into the transportation matching service 410 and providing one or more outputs 408 for improving transportation MaaS in order to match user profiles a selected route and selected mode of transportation and to increase the accuracy of the matching. In one aspect, the transportation matching service 410 may operate in a cloud environment where multiple users' profiles are matched and/or operate in a single user environment.

For example, one or more inputs 402 such as user data, mapping information, environmental factors, traffic parameters/data, user/driver profiles, route profiles, means or modes of transportation, travel services, and the like, may be integrated together using the transportation matching service 410 to obtain a selected match between driver, routes, and mode of transportation. The driver profile module 440 may be used to collect, store, and/or retrieve data relating to a user such as, for example, transportation preferences, driving habits, experiences, driving habits, calendar information, preferences and interests of the user, KPIs, a physical or emotional condition of the user, travel experience of the user, preferred transportation means, common travel destinations, and the like. The route profile module 450 may include a maximum or minimum speed relating to a route, a type of travel route (e.g., highway, interstate freeway, rail road, subway, airport flight routes), a length of a travel route, an elevation, mapping information, and one or more points of interest, wherein the user profile includes. The environmental factors module 460 includes at least weather, traffic conditions, construction, legal restrictions or requirements, and transportation services. A mode of transportation means may include a vehicle, a train, plane, and private and/or public transportation options.

The driver profile module 440, the route profile module 450, the environmental factors module 460, and/or the transportation matching service 410 may be used to generate an output 408 of all potential transportation routes from an origin to a destination while considering one or more various modes of transportation based on the user/driver profile, route profile, and/or environmental factors. The output 408 may be a customized and enhanced trip model (e.g., a "travel package") that includes all of the routes, a ranked score of each of the routes, similar users using similar routes, car sharing options, advertisements/offers, and/or a combination thereof. The matching module 480 may match, and provide to the output 408, a selected mode of transportation with a route option for a user according to a multi-objective model based on a route profile, a user profile, an environmental profile, and a collaboration of data to preferences of transportation means and route options of one or more drivers similar to the user.

The driver profile module 440, the route profile module 450, and the environmental factors module 460 may each undergo various data analytics functions associated with the transportation matching service 410. As one of ordinary skill in the art will appreciate, the driver profile module 440, the route profile module 450, and the environmental factors module 460 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In one aspect, the various functional units in transportation matching service 410 analysis may apply to one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
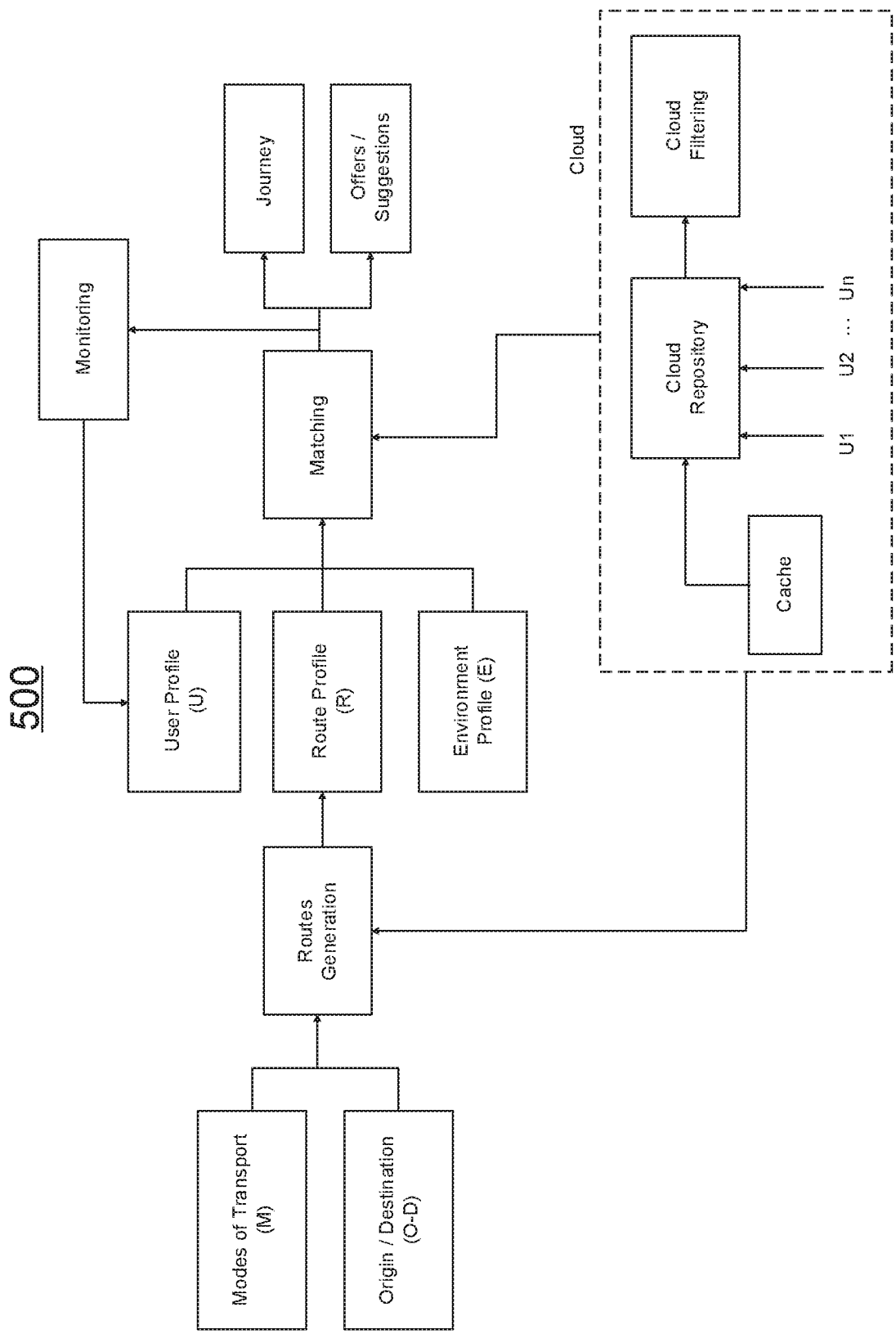
FIG. 5 is a block diagram of exemplary hardware structures when used in combination with the processing components of the present invention, effecting various mechanisms of the illustrated embodiments.

Turning to FIG. 5, a block diagram of various hardware 500 equipped with various functionality as will be further described is shown in which aspects of the mechanisms of the illustrated embodiments may be realized. In one aspect, one or more of the components, modules, services, applications, and/or functions described in FIGS. 1-4 may be used in FIG. 5. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks.

For example, computer system/server 12 of FIG. 1 may be included in FIG. 5 and may be connected to other computing nodes (such as computer systems of transportation services or modes of transportation) over a distributed computing network, where additional data collection, processing, analytics, and other functionality may be realized. The computer system/server 12 of FIG. 1, may include a multi-objective model for route generation. In one aspect, the multi-objective model may receive information relating to modes of transportation (M) and origin and destination (O-D) information. In one aspect, the receive information (input) may be received from an external computing device, such as, for example a graphical user interface (GUI) from a smartphone or computer, that may be in communication with the computer system/server 12 of FIG. 1.

In one aspect, the modes of transportation may include public or private transportation options (e.g., bus, cab, subway taxi), a schedule or time table, various transportation pricing schemes and services, and/or private car information such as, for example, the health state of the car (year, make, model, service records, warranty information, mileage, seating and storage capacity, safety information, etc.) and/or fuel consumptions.

The multi-objective model for route generation may utilize a user (driver) profile (U), a route profile (R), and/or environment profile (E) for generating all potential transportation routes from the origin to the destination while considering one or more various modes of transportation. The user profile may be used to collect, store, and/or retrieve data relating to a user such as, for example, transportation preferences, driving habits, experience, calendar information, preferences and interests of the user (e.g., travel preferences such as a preference for use of the subway over use of a private taxi service), key performance indicators (KPI), a physical or emotional condition of the user, travel experience of the user, preferred transportation means, and common travel destinations.

In one aspect, the KPIs may correspond to a tailored and weighted user information. For example, a KPI may be considered as a score that is defined or given by the user according to multiple dimensions and those KPIs are at the same time input and output of the system and may dynamically change according to user behavior and preferences. For example, the score or value of those parameters may be defined as being between 0 and 1 where 0 means no association between the KPI and the user and 1 implies a high association. Examples of KPIs may include, but are not limited to: 1) environmental "greenness": the user is willing to use alternative and green methods of transportation such as bus or carpooling, 2) route preferences: the user prefers certain routes to be avoided (e.g. toll roads), 3) safety preferences: user tendency to prefer safer routes (avoid steep roads, etc.), and/or 4) social preferences: user prefers to travel with specific users only. Examples of other KPIs may include: congestion: time spent in traffic, pollution along one or more routes, public system utilization, savings from offers and discounts, vehicle health, and/or other user defined KPIs, or a combination thereof.

The route profile (R) includes a maximum or minimum speed, a type of travel route, a length of a travel route, an elevation, mapping information, and one or more points of interest, wherein the user profile includes driving habits, calendar information, preferences and interests of the user, key performance indicators, a physical or emotional condition of the user, travel experience of the user, preferred transportation means, and common travel destinations. Each generated route option may be provided a score or rank such as, for example, from highest to lowest with a highest value assigned being ranked as most important and lowest value assigned being ranked as the least important. In one aspect, score may be based collectively on the user profile, route profile, and/or environmental profile such as the user's preferences, transportation habits, experience, weather, and the like. For example, a user may prefer to use a private car mode of transportation for commuting from the user's home to an airport during the summer months, which would generate a score greater than a score for commuting on a bus from the user's home to the airport during the summer months.

The environmental profile (E) includes at least weather, traffic conditions, construction, legal restrictions or requirements, and transportation services.

The multi-objective model used for "matching" may match a selected mode of transportation with a route option for a user (e.g., user "U1", user "U2", and/or user "Un") according to a multi-objective model based on a route profile, a user profile, an environmental profile, and a collaboration of data to preferences of transportation means and route options of one or more drivers similar to the user. The matching may include providing one or more travel related commercial offerings and/or services based on the matching route and mode of transportation. The matching may also include providing an output or "journey" from the origin to the destination based on the best route, which may also include an estimated cost of the trip along with a trip schedule and energy consumption (e.g., amount of fuel consumed).

The user profile may be continuously improved and enhanced by monitoring user decisions. The monitoring may include determining if the user is following and selecting the matched route(s) and mode of transportation and any interaction between the user and the matching. Each decision of the user is used as feedback back to the user profile to learn (e.g., using machine learning) about the user and to predict future user behavior.

In an additional aspect, cloud computing (e.g., a service provider environment) may be used as a data repository and/or used for filtering. In one aspect, a cloud repository and filtering service ("cloud filtering") may be used for receiving input for the route generation and/or matching such as, for example, to provide an option of ride sharing as a mode of transportation. The filtering operation may be performed according to geographic location and user profile of the matching. The cloud computing service may function as a cache system, using at least one cache, to avoid computation of any of the route options for similar origins and destinations.

With the foregoing functional components in view, consider some of the various aspects and user cases of the illustrated embodiments.

Use Case 1—Customized Journey. Assume a user, Alice, is planning for a trip. Alice plans to take a long weekend away from a city in which she resides. Alice is planning to use her car for the journey from her home (origin) to her destination. Before starting the journey, Alice inputs her destination information via a computer device (e.g., smartphone) which is in association with the embodiments of the present invention, which may be internal or external to the computer device. Once the destination is provided, the mechanisms of the embodiment (e.g., customized multimodal solution) may obtain access to information regarding the available modes of transportation. A number of possible routes for each of the modes of transportation may be generated. The number of possible routes may be matched with Alice's user profile, weather conditions, traffic conditions; and/or modes of transportation. Also, based upon the health state of the modes of transportation (e.g., a car) and also severe traffic/weather conditions along the journey, a best matching route and mode of transportation option may indicate that taking the train would be the best choice based on the user profile, route profile, modes of transportation, and the environmental factors. A specific train that travels directly from Alice's origin to Alice's destination may be located, identified, and/or provided back to Alice via the computing device, while also provides the departure times and location. Once the computations above are performed, the mechanisms of the embodiment (e.g., customized multimodal solution) returns to Alice the recommended mode of transportation. A customized journey is recommended to Alice, together with additional insights and explanations on why this recommendation was given. For example, Alice may observe on her smartphone a message: "Alice, given the [car conditions] and the [weather/traffic conditions] we recommend you take the train for your journey. Some advantages of this suggestion include: (i) the train has a scenic route, we know you enjoy seeing the outdoors and nature; (ii) taking the train you will produce [less pollution], we know how much you care about the environment; (iii) taking the train will result in a trip only "x" minutes longer than a car trip.

Use Case 2—Customized Pricing. Assume a user, Bob, is frequently commuting to work each day. Bob first takes his car to the closest rail station and then takes the train to his workplace. In one aspect, the present technology (e.g., "system") monitors Bob during his daily routine, which may use machine learning to determine and learn Bob's travel routines. When the system is confident about the routine of Bob, the system may match Bob's user profile with the various modes of transportation. Given the fares and the routine of Bob, the system checks different alternatives to optimize the journey. Once the best journey (e.g., least expensive journey as compared to more expensive journey) is optimized and determined, one or more travel service coupons, advertisements, and/or travel discounts may be provided to Bob. For example, if Bob parks 5 days a week at given parking lot, a 5% discount to park at the identified parking facility may be provided to Bob. Once the computations above are performed, the system returns to Bob a discounted fare that is optimized for his needs.

Use Case 3—Retail Advertising. Assume a user, Alice, is planning for a trip or journey. During the journey, Alice's position (e.g., geographical coordinates) may be determined and located, such as, for example, using global positioning satellite (GPS) or other technology. Based on determined location of Alice, Alice's user profile may be matched to one or more nearby stores and points of interest. The stores and points of interest identified may also be matched with opinions of users similar to Alice. A number of opportunities available at each store that Alice may be interested in may be determined or identified. As a result, one or more number of messages may be provided to Alice (e.g., via a smartphone or computing device) containing: 1) one or more stores of interest to Alice, 2) one or more points of interest (e.g., cultural, historical, educational, etc.), 3) a rating from users similar to Alice, and/or 4) one or more suggested travel offers, coupons, advertisements, discounts, and/or services.

Use Case 4—Car Sharing. Assume, a user, Bob needs to travel from his current location to his home. The mechanisms of the embodiments may already know his intended destination (e.g., machine learning used to determine and understand the user Bob's travel habits) and may also provide an indication to those in communication with Bob about his availability to share his car with other people (e.g., Bob is willing to ride share with others). Bob's user profile (indicating a willingness to ride share) may be matched with other users similar to Bob which are close to his current location and are willing to go to a similar destination (for example users need to drop their kids at school and go to a common workplace). One or more subset of users may be identified that are similar to Bob. Once a subset of users has been identified, the subset of user profiles may be matched with the profile of Bob. The users may be scored or ranked which determines and identifies those of the users that have a user profile identical to or closer to Bob as compared to other user profiles. A number of user profiles may be sent to a computing device associated with Bob (e.g., a smartphone) and displayed on the computing device (e.g., displayed in ranked order on the smartphone). In one aspect, the user, Bob, may review the user profiles and select those of the matching user profiles that the user, Bob, feels more comfortable traveling with. Bob may also set a price for the ride from the origin to the destination. The user profiles identified by Bob are notified of his availability and of the ride price. If one or more of the users accepts Bob's offer, then the user may agree on a meeting point. The service of the ride share may be paid during the journey via a payment application associated with a computing device of Bob.

In this way, the present invention provides novelty and benefits over the current state of the art by the use and integration of multiple inputs (environment, traffic, driver profiles, other drivers, etc.) to obtain the best match between driver, routes, and mode of transportation, integration of a multi-objective optimization model including various KPIs (microscopic and macroscopic), and by suggesting or providing advertisements/offers related to price offerings, retail discounts, and parking options. Also, the present invention provides for monitoring a user decision in order to improve the matching approach and update the driver profile and may consider multiple users to provide route options for shared segments.

Figure 6:
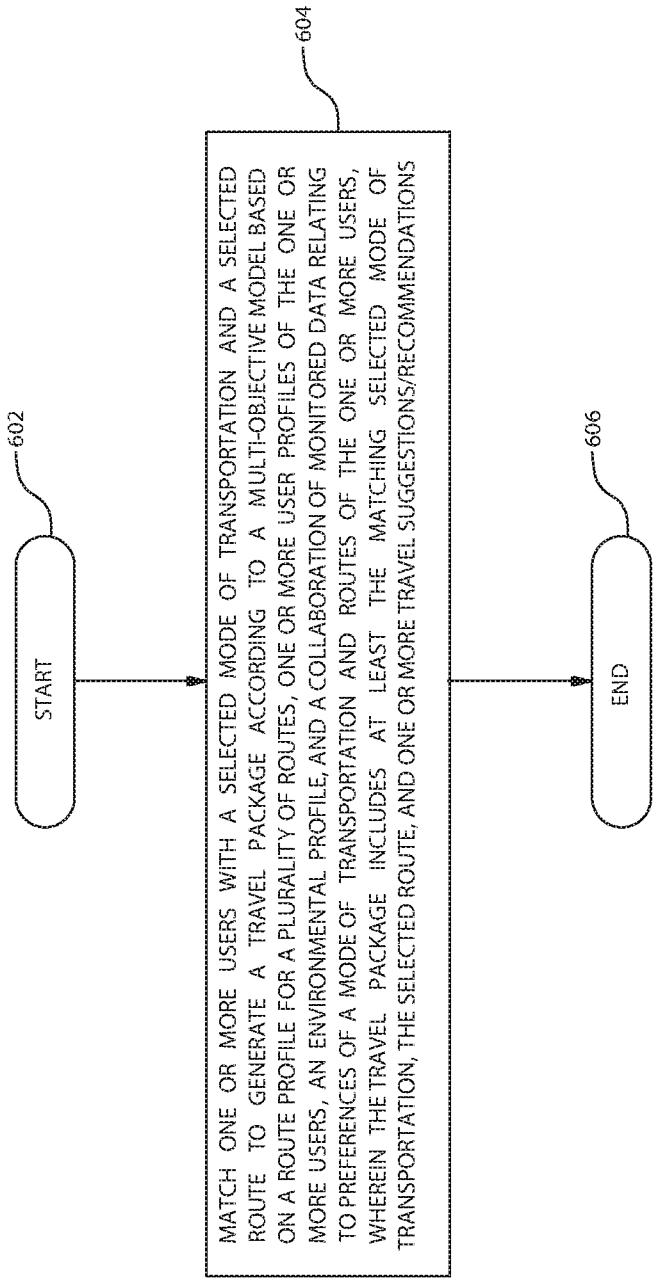
FIG. 6 is a flowchart diagram of an exemplary method for improving travel mobility as a service (MaaS) by providing customized multi-modal solutions based on user preference by a processor, in which various aspects of the present invention may be realized.

Turning now to FIG. 6, a method 600 for improving travel mobility as a service (MaaS) by providing customized multi-modal solutions based on user preference by a processor is depicted. The functionality 600 may be implemented as a method executed as instructions on a machine, where the instructions are included on at least one computer readable medium or one non-transitory machine-readable storage medium. The functionality 600 may start in block 602. A selected mode of transportation may be matched with a selected route to generate a travel package according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions/recommendations, as in block 604. The functionality 600 may end, as in block 606.

In one aspect, in conjunction with and/or as part of at least one block of FIG. 6, the operations of method 600 may include each of the following. The operations of method 600 may generate a plurality of route options from the plurality of routes to perform the matching according to integrated data based on the route profile, the user profile, and the environmental profile and/or match one of a plurality of modes of transportation with one of the generated route options according to the integrated data upon generating the plurality of routes.

The operations of method 600 may select the selected mode of transportation and the selected route from one of a plurality of route options by the user, wherein the route profile includes a maximum or minimum speed, a type of travel route, a length of a travel route, an elevation, mapping information, and one or more points of interest, wherein the user profile includes driving habits, calendar information, preferences and interests of the user, KPIs, a physical or emotional condition of the user, travel experience of the user, preferred transportation means, common travel destinations, wherein the environmental profile includes at least weather, traffic conditions, construction, legal restrictions or requirements, and transportation services, and wherein a selected mode of transportation is a vehicle, a train, or plane.

Each interaction, via an interactive GUI on a computing device for example, (e.g., rejection, selection, or any feedback) by the one or more users relating to the selected mode of transportation and the selected route may be monitored using machine learning to increase the accuracy of the matching, wherein a virtual computing system filters and stores the data relating to the machine learning to increase the accuracy of the matching. Each one of a plurality route options available for the matching may be ranked according to a route score, wherein the route score is based upon the collaboration of data and one or more user profiles for the one or more users.

The operations of method 600 may provide in the travel package one or more travel related commercial offers and services, travel pricing alternatives, estimated travel costs, and parking options, and/or provide the selected mode of transportation with the selected route for the one or more users to share with one or more drivers similar to the one or more users.

Figure 7:
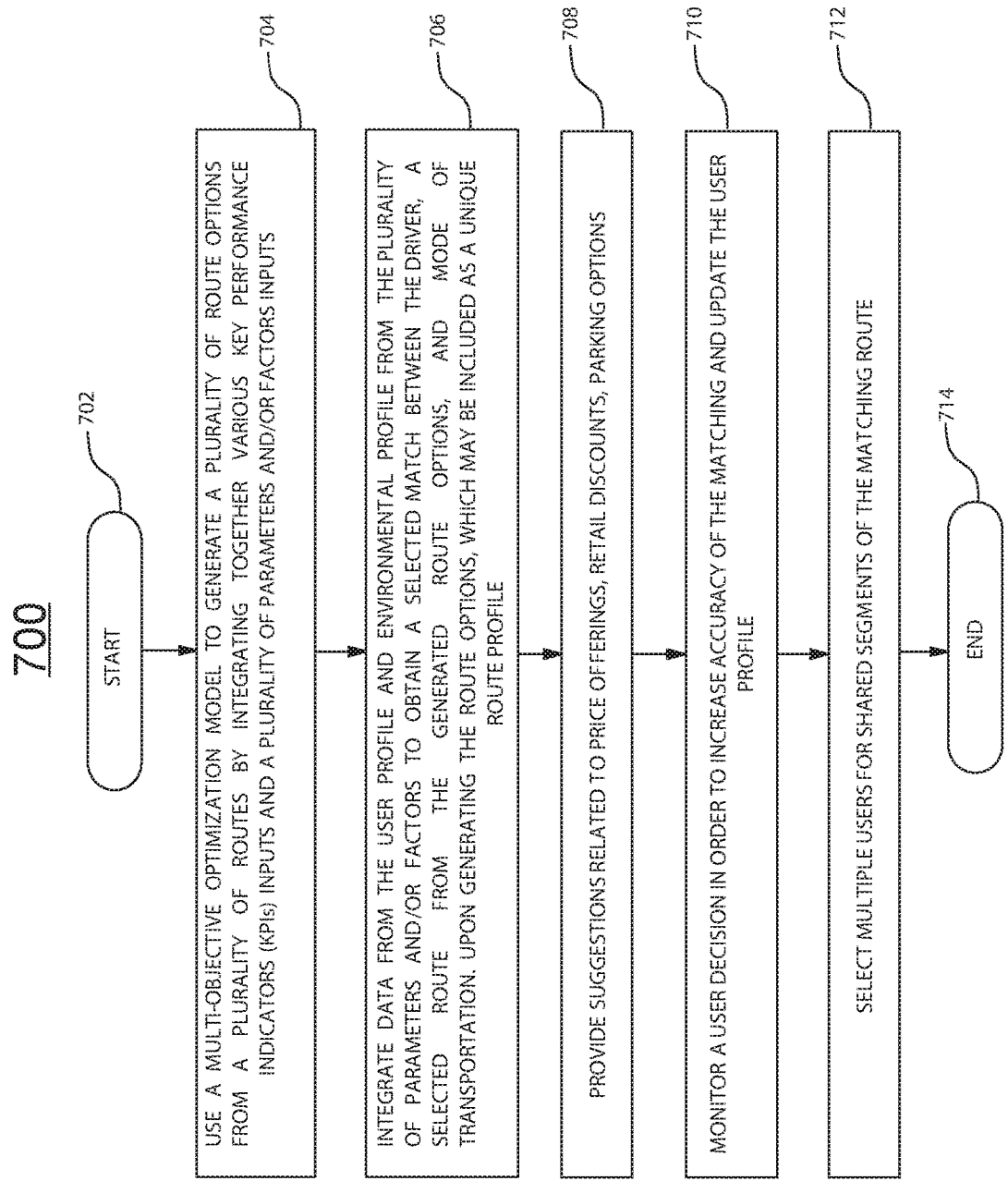
FIG. 7 is a flowchart diagram of an additional exemplary method for improving travel mobility as a service (MaaS) by providing customized multi-modal solutions based on user preference by a processor, in which various aspects of the present invention may be realized.

Turning now to FIG. 7, a method 700 for improving travel mobility as a service (MaaS) by providing customized multi-modal solutions based on user preference by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. A multi-objective optimization model may be used to generate a plurality of route options from a plurality of routes by integrating together various key performance indicators (KPIs) (microscopic and macroscopic) inputs and a plurality of parameters and/or factors inputs (e.g., environmental factors, traffic parameters/data, driver profiles, route profiles, means or mode of transportation, travel services, and the like), as in block 704. Upon generating the route options, which may be included as a unique route profile, at least both of the user profile and environmental profile, from the plurality of parameters and/or factors, may be integrated to obtain a selected match between the driver, a selected route from the generated route options, and mode of transportation, as in block 706. One or more suggestions related to price offerings, retail discounts, parking options may be provided, as in block 708. A user's decision relating to the selected match and/or one or more suggestions may be monitored (and/or learned via machine learning) in order to increase accuracy of the matching and update the driver profile, as in block 710. One or more multiple users may be selected for shared segments of the matching route (selected route), as in block 712. The functionality 700 may end, as in block 714.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for improving travel mobility as a service (MaaS), comprising:
   determining, by the processor, a current geographical position of a mobile device according to global positioning satellite (GPS) data received by a GPS system integrated into the mobile device;
   matching, by the processor, one or more users with a selected mode of transportation and a selected route to generate a travel package displayed to the one or more users using a display of the mobile device according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions based, at least in part, on the current geographical position of the mobile device as determined by the GPS system;
   selecting, by the processor, the selected mode of transportation and the selected route from one of a plurality of route options by the one or more users, wherein the route profile includes a maximum or minimum speed, a type of travel route, a length of a travel route, an elevation, mapping information, and one or more points of interest, wherein the user profile includes driving habits, calendar information, preferences and interests of the user, key performance indicators, a physical or emotional condition of the user, travel experience of the user, preferred transportation means, common travel destinations, wherein the environmental profile includes at least weather, traffic conditions, construction, legal restrictions or requirements, and transportation services, and wherein a selected mode of transportation is a vehicle, a train, or plane;
   monitoring, by the processor, each interaction by the one or more users relating to the selected mode of transportation and the selected route and correlating the selected mode of transportation and the selected route to the collaboration of monitored data related to the preferences;
   training, by the processor, an artificial neural network (ANN) classifier of the multi-objective model using each monitored interaction to increase an accuracy of the matching such that interactions between the user and the mobile device are used as a feedback loop to iteratively train the ANN classifier according to an amalgamation of the route profile, the user profile of the one or more users, the environmental profile, and the collaboration of monitored data, wherein a virtual computing system filters and stores training data relating to the training of the ANN classifier commensurate with each of the iterations; and
   automatically generating, by the processor, the travel package on the display of the mobile device for presentation to the one or more users according to an output of the multi-objective model having the trained ANN classifier to match the one or more users with the selected mode of transportation and the selected route; wherein generating the travel package further includes displaying, in natural language, identified advantages of the generated travel package relative to the user profile of characteristics learned from the one or more users based on a history of the monitored interactions.

2. The method of claim 1, wherein the matching further includes:
   generating a plurality of route options from the plurality of routes to perform the matching according to integrated data based on the route profile, the user profile, and the environmental profile; or
   matching one of a plurality of modes of transportation with one of the generated route options according to the integrated data upon generating the plurality of routes.

3. The method of claim 1, further including ranking each one of a plurality of route options available for the matching according to a route score, wherein the route score is based upon the collaboration of data and one or more user profiles for the one or more users.

4. The method of claim 1, further including providing in the travel package one or more travel related commercial offers and services, travel pricing alternatives, estimated travel costs, and parking options.

5. The method of claim 1, further including providing the selected mode of transportation with the selected route for the one or more users to share with one or more drivers similar to the one or more users.

6. A system for improving travel mobility as a service (MaaS), comprising:
   one or more processors coupled to one or more memory devices storing executable instructions that:
      determine, by the one or more processors, a current geographical position of a mobile device according to global positioning satellite (GPS) data received by a GPS system integrated into the mobile device;
      match, by the one or more processors, one or more users with a selected mode of transportation and a selected route to generate a travel package displayed to the one or more users using a display of the mobile device according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions based, at least in part, on the current geographical position of the mobile device as determined by the GPS system;
      select, by the one or more processors, the selected mode of transportation and the selected route from one of a plurality of route options by the one or more users, wherein the route profile includes a maximum or minimum speed, a type of travel route, a length of a travel route, an elevation, mapping information, and one or more points of interest, wherein the user profile includes driving habits, calendar information, preferences and interests of the user, key performance indicators, a physical or emotional condition of the user, travel experience of the user, preferred transportation means, common travel destinations, wherein the environmental profile includes at least weather, traffic conditions, construction, legal restrictions or requirements, and transportation services, and wherein a selected mode of transportation is a vehicle, a train, or plane;

monitor, by the one or more processors, each interaction by the one or more users relating to the selected mode of transportation and the selected route and correlating the selected mode of transportation and the selected route to the collaboration of monitored data related to the preferences;

train, by the one or more processors, an artificial neural network (ANN) classifier of the multi-objective model using each monitored interaction to increase an accuracy of the matching such that interactions between the user and the mobile device are used as a feedback loop to iteratively train the ANN classifier according to an amalgamation of the route profile, the user profile of the one or more users, the environmental profile, and the collaboration of monitored data, wherein a virtual computing system filters and stores training data relating to the training of the ANN classifier commensurate with each of the iterations; and automatically generate, by the one or more processors, the travel package on the display of the mobile device for presentation to the one or more users according to an output of the multi-objective model having the trained ANN classifier to match the one or more users with the selected mode of transportation and the selected route; wherein generating the travel package further includes displaying, in natural language, identified advantages of the generated travel package relative to the user profile of characteristics learned from the one or more users based on a history of the monitored interactions.

7. The system of claim 6, wherein the one or more processors:

generate a plurality of route options from the plurality of routes to perform the matching according to integrated data based on the route profile, the user profile, and the environmental profile; or match one of a plurality of modes of transportation with one of the generated route options according to the integrated data upon generating the plurality of routes.

8. The system of claim 6, wherein the one or more processors rank each one of a plurality of route options available for the matching according to a route score, wherein the route score is based upon the collaboration of data and one or more user profiles for the one or more users.

9. The system of claim 6, wherein the one or more processors provide in the travel package one or more travel related commercial offers and services, travel pricing alternatives, estimated travel costs, and parking options.

10. The system of claim 6, wherein the one or more processors provide the selected mode of transportation with the selected route for the one or more users to share with one or more drivers similar to the one or more users.

11. A computer program product for improving travel mobility as a service (MaaS) by a processor, the computer program product comprising a non-transitory computer-readable storage medium having computer-readable program code portions stored therein, the computer-readable program code portions comprising:

an executable portion that determines, by the processor, a current geographical position of a mobile device according to global positioning satellite (GPS) data received by a GPS system integrated into the mobile device;

an executable portion that matches, by the processor, one or more users with a selected mode of transportation and a selected route to generate a travel package displayed to the one or more users using a display of the mobile device according to a multi-objective model based on a route profile for a plurality of routes, a user profile of the one or more users, an environmental profile, and a collaboration of monitored data relating to preferences of a mode of transportation and routes of the one or more users, wherein the travel package includes at least the matching selected mode of transportation, the selected route, and one or more travel suggestions based, at least in part, on the current geographical position of the mobile device as determined by the GPS system;

an executable portion that selects, by the processor, the selected mode of transportation and the selected route from one of a plurality of route options by the one or more users, wherein the route profile includes a maximum or minimum speed, a type of travel route, a length of a travel route, an elevation, mapping information, and one or more points of interest, wherein the user profile includes driving habits, calendar information, preferences and interests of the user, key performance indicators, a physical or emotional condition of the user, travel experience of the user, preferred transportation means, common travel destinations, wherein the environmental profile includes at least weather, traffic conditions, construction, legal restrictions or requirements, and transportation services, and wherein a selected mode of transportation is a vehicle, a train, or plane;

an executable portion that monitors, by the processor, each interaction by the one or more users relating to the selected mode of transportation and the selected route and correlating the selected mode of transportation and the selected route to the collaboration of monitored data related to the preferences;

an executable portion that trains, by the processor, an artificial neural network (ANN) classifier of the multi-objective model using each monitored interaction to increase an accuracy of the matching such that interactions between the user and the mobile device are used as a feedback loop to iteratively train the ANN classifier according to an amalgamation of the route profile, the user profile of the one or more users, the environmental profile, and the collaboration of monitored data, wherein a virtual computing system filters and stores training data relating to the training of the ANN classifier commensurate with each of the iterations; and an executable portion that automatically generates, by the processor, the travel package on the display of the mobile device for presentation to the one or more users according to an output of the multi-objective model having the trained ANN classifier to match the one or more users with the selected mode of transportation and the selected route; wherein generating the travel package further includes displaying, in natural language, identified advantages of the generated travel package relative to the user profile of characteristics learned from the one or more users based on a history of the monitored interactions.

12. The computer program product of claim 11, further including an executable portion that:
   generates a plurality of route options from the plurality of routes to perform the matching according to integrated data based on the route profile, the user profile, and the environmental profile; or
   matches one of a plurality of modes of transportation with one of the generated route options according to the integrated data upon generating the plurality of routes.

13. The computer program product of claim 11, further including an executable portion that ranks each one of a plurality of route options available for the matching according to a route score, wherein the route score is based upon the collaboration of data and one or more user profiles for the one or more users.

14. The computer program product of claim 11, further including an executable portion that:
   provides in the travel package one or more travel related commercial offers and services, travel pricing alternatives, estimated travel costs, and parking options; or
   provides the selected mode of transportation with the selected route for the one or more users to share with one or more drivers similar to the one or more users.

* * * * *